Dec. 21, 1943.    J. D. RYAN    2,337,275
PROCESS OF PRODUCING LAMINATED SAFETY GLASS
Filed Jan. 29, 1943    2 Sheets-Sheet 1

Inventor
JOSEPH D. RYAN.
By Frank Fraser
Attorney

Dec. 21, 1943. J. D. RYAN 2,337,275
PROCESS OF PRODUCING LAMINATED SAFETY GLASS
Filed Jan. 29, 1943 2 Sheets-Sheet 2

Inventor
JOSEPH D. RYAN.
By Frank Fraser
Attorney

Patented Dec. 21, 1943

2,337,275

UNITED STATES PATENT OFFICE 2,337,275

PROCESS OF PRODUCING LAMINATED SAFETY GLASS

Joseph D. Ryan, Toledo, Ohio, assignor to Libbey-Owens-Ford Glass Company, Toledo, Ohio, a corporation of Ohio Application January 29, 1943, Serial No. 473,959

4 Claims. (Cl. 154—2.75)

The present invention relates to laminated safety glass and to an improved process of producing the same.

As is well known, laminated safety glass is largely manufactured by interposing a layer or sheet of preformed thermoplastic material between two sheets of glass and then effecting the bonding of the laminations together by the application of heat and pressure to provide a composite structure. However, to some extent, laminated safety glass has been manufactured by flowing a film of plastic material on each of the glass sheets, drying the films, and then bonding the coated surfaces of the glass sheets together by a heat and pressure treatment.

A serious drawback, however, to the use of the flow type method of making laminated glass has been the large amount of time required to accomplish the drying of the films on the glass prior to compositing of the sheets. The reason for the great amount of time required in the drying of the films results from the fact that volatile solvents are employed in solution of the plastic material and the removal of the volatile solvents without bubbling of the films requires prolonged and careful manipulation. Failure to remove the volatile solvents results in poor stability of the finished laminated glass, due to the tendency of the volatile solvents to evaporate in gaseous form, leading to bubble formation in the plastic interlayer. Consequently, regardless of the inherent stability of the plastic interlayer per se, unsightly and unstable laminated glass is obtained if the volatile solvents are not completely removed. The use of volatile solvents likewise requires very careful drying, since at no time during the drying step can the plastic film be heated to such a temperature that the vapor pressure of the solvent is sufficient to form gas bubbles.

This invention is directed to an improved process of manufacturing laminated safety glass and has as its principal object the elimination of the use of volatile solvents in the flow method of manufacturing laminated safety glass. In order to accomplish this, I have discovered, after long experimentation, that resins and cellulose derivatives have what may be termed a limited retentivity for plasticizers which, of course, is the other main ingredient of the thermoplastic compositions used as safety glass interlayers.

By way of illustration, 100 parts of polyvinyl butyracetal resin of the type now employed for the manufacture of laminated safety glass, which analyzes as follows,

| | Per cent |
|---|---|
| Vinyl alcohol content as polyvinyl alcohol | 19.5 |
| Vinyl acetate content as polyvinyl acetate | 0.9 |
| Vinyl butyracetal content as polyvinyl butyracetal | 79.5 | is compounded with 100 parts of dibutyl sebacate by working the mixture on malaxating rolls or in other plastic-forming equipment and a plastic film is formed. Leaving the plastic forming device, the film has good clarity and appears to be satisfactory in all respects; however, on standing at the ordinary temperatures and ordinary relative humidities exudation of the plasticizer occurs, resulting in the formation of a liquid film on the surface of the plastic. If, on the other hand, 50 parts of dibutyl sebacate are compounded with 100 parts of the same resin under the same conditions, no plasticizer exudation occurs. In other words, exudation or separation of the plasticizer from the resin plastic occurs somewhere between 50 and 100 parts of plasticizer. Use of greater amounts of plasticizer than 100 always results in exudation and it has been found that as the amount of plasticizer is increased above 100 parts, more rapid and greater amounts of exudation occur in direct proportion to the excess used.

On the other hand, if a different plasticizer is employed with the same polyvinyl butyracetal resin, a different plasticizer tolerance is obtained; that is to say, while the retentivity of the polyvinyl butyracetal resin for dibutyl sebacate lies somewhere between 50 and 100 parts of plasticizer, the retentivity of each individual plasticizer by each individual resin or cellulose derivative is a characteristic and well defined property, which can be readily ascertained by experimentation.

Experiments conducted with cellulose acetate, cellulose acetate butyrate, ethyl cellulose, polymethacrylate resins, a large number of polyvinyl acetal resins, polyvinyl acetate, and numerous other resins and cellulose derivatives of the thermoplastic type, showed that each has a definite plasticizer retentivity for each individual plasticizer and that as plasticizers are changed with any given resin or cellulose derivative, the amount of plasticizer retained is variable, but characteristically definite for one particular resin and one particular plasticizer.

Also included in my studies were materials which failed to plasticize the particular cellulose derivative or resin, as well as those which produced a plasticizing effect. To illustrate, dibutyl phthalate when mixed with cellulose acetate and worked into a plastic mass actually fails to yield a thermoplastic mass, except at temperatures above the melting point of cellulose acetate, and this occurs due to the fact that the dibutyl phthalate is not retained by the cellulose acetate to any great degree. On the other hand, dimethyl phthalate can be used in large proportions, say 200 to 300 parts of dimethyl phthalate to cellulose acetate of the acetone-soluble variety, without any noticeable exudation of the plasticizer. When admixed, however, these plasticizers behave differently and it is therefore possible to govern the plasticizer retentivity by mixing a true plasticizer with a non-plasticizer to accomplish any desired result.

In my improved process of making laminated glass, the thermoplastic resin or cellulosic derivative is dissolved in a relatively large proportion of the plasticizer or mixture of plasticizers selected as the final plasticizer ingredient of the film to be formed on the glass sheet, the proportions of plasticizer being so large that an actual solution of the resin or cellulosic derivative in the plasticizer occurs. This solution step is preferably accomplished by heating the resin or cellulosic derivative in suitably subdivided state with the plasticizer at an elevated temperature to provide a solvent-free dope.

After the solution of the resin or cellulosic derivative has taken place, the material still at elevated temperatures is made bubble-free either by standing or by use of a vacuum and then is transferred to a glass coating machine, which can be of the trough or roll type, and a film of very highly plasticized resin transferred to the glass. In general, the temperature of the glass should always be below that of the solvent-free dope to be formed on the glass to avoid bubbling, but the temperature of the glass should be high enough so as to obviate breakage of the glass due to thermal shock, for in some instances temperatures well above the boiling point of water must be employed in order to accomplish the coating of the glass with the very highly plasticized resin or cellulosic derivative layer.

The amount of material to be placed on the glass, of course, is predetermined and can be regulated by the film forming device, whether it be rolls or a trough. Such factors as viscosity, temperature of the glass, temperature of the volatile solvent-free dope, etc., play a large part in determining the quantity of material to be placed on the glass and must be regulated to give the desired results. In general, the viscosity of the dope where a trough-like device is employed should be such that it will result in cut-off of the plastic dope at the edges of the glass as the film is formed, thereby avoiding overflow and wastage.

As the film leaves the coating machine, the plastic layer on the glass sheet is so highly plasticized as to be definitely unsatisfactory as an interlayer for safety glass manufacture, due to the very large amount of plasticizer which renders the resultant film soft and totally lacking in strength.

The next step in the process of this invention involves cooling of the glass to ordinary room temperature or lower in a suitably regulated humidity to accomplish the exudation of the plasticizer. By regulating the temperature of the film and the relative humidity of the air in the room above the film, the exudation of the plasticizer can be controlled, but in no circumstances can the amount of plasticizer removed from the film by this method go below the retentivity of the cellulose derivative or resin for that particular plasticizer. However, by mixing plasticizers which have higher retentivity than desired with materials of similar high boiling characteristics but of no or poor retentivity (i. e., non-plasticizers), the exudation of the plasticizer from the film can be adequately governed and the desired composition of film on the glass obtained.

It should be pointed out that exudation takes place quite rapidly, as contrasted with the drying out of a volatile solvent of a film on the glass, and it should be further pointed out that if the compositing of the coated glass sheets is conducted before all of the exudation has occurred, the presence of small amounts of plasticizer does not lead to poor stability of the finished laminated glass, since the materials employed are all high boiling, low vapor pressure plasticizers, or nonsolvents, and not of the volatile or high vapor pressure type.

Briefly summarizing, the proposed process for the manufacture of the laminated glass involves forming a film of very highly plasticized resin or cellulose derivative on the glass, cooling the film to produce exudation of the undesired excess amount of plasticizer, then sandwiching two lights of glass so coated, and finally compositing the unit under heat and pressure.

In the drawings, wherein like numerals are employed to designate like parts throughout the same:

As pointed out above, the thermoplastic resin or cellulosic derivative is dissolved in a relatively large proportion of the plasticizer or mixture of plasticizers selected as the final plasticizer ingredient of the film to be formed on the glass sheets; the proportions of plasticizer being sufficiently large that an actual solution of the resin or cellulosic derivative in the plasticizer occurs. By way of example, five parts of polyvinyl butyracetal resin described above may be dissolved in 95 parts of dibutyl sebacate by heating at a temperature of approximately 284° F. with constant stirring. The solution thus formed is cooled to approximately 212° F. and then applied to the glass.

Figure 1:
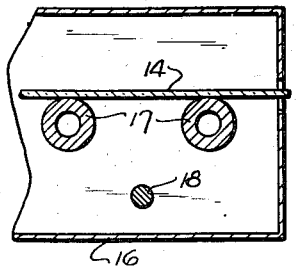
Fig. 1 is a vertical transverse section through a flow type machine for applying the highly plasticized resin or cellulosic derivative films on the glass sheets and shown positioned between a heating chamber and a cooling chamber.
Figure 1:
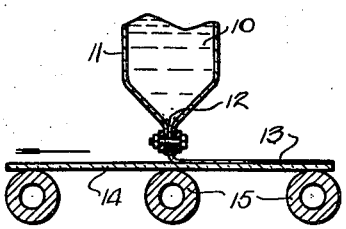
Figure 1:
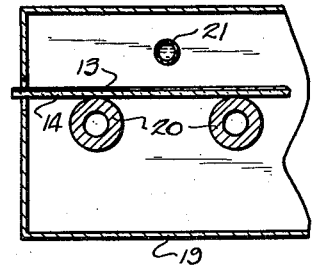

This application of the solution to the glass may be accomplished, as shown in Fig. 1, by placing a mass of the plastic material 10 in a suitable hopper or trough 11 provided in the bottom thereof with an adjustable slot opening 12 through which the plastic material is extruded in the form of a film 13 of the desired thickness upon a sheet of glass 14 disposed in a horizontal position and adapted to be carried past the opening 12 upon a roller conveyor 15 or other suitable conveying means. The trough or hopper 11 may be suitably heated to maintain the mass of plastic material 10 at the desired temperature.

Prior to being coated, the glass sheet 14 is heated to a temperature of approximately 176° F. to 194° F. and for this purpose it may be passed through a heating chamber 16, being supported therein upon rollers or the like 17. The chamber 16 may be heated in any desired manner such as by means of the electrical resistance units 18. As the glass sheet issues from the heating chamber 16, it passes underneath the trough 11 where it receives the film 13 of highly plasticized plastic material; the thickness of the film being dependent upon the final thickness desired in the finished laminated glass.

After being coated, the glass sheet is preferably cooled to approximately 68° F. or lower in an atmosphere having a relative humidity of 70%, whereupon the excess plasticizer comes to the surface of the coating in a very short time. Thus, after being coated, the glass sheet can be passed through a cooling chamber 19 upon rolls or the like 20; said chamber being cooled in any desired manner such as by circulating cold water through pipes 21.

Figure 3:
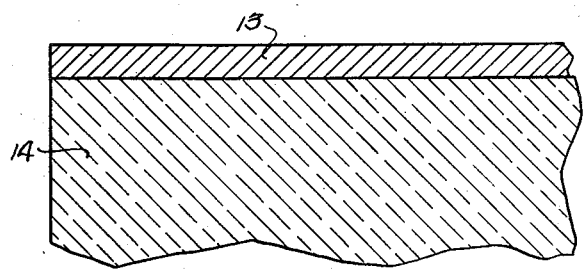
Fig. 3 shows a sheet of glass having a film of plastic material applied thereto.
Figure 4:
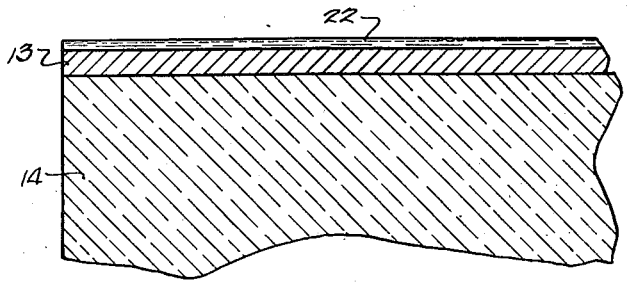
Fig. 4 is a similar view showing diagrammatically the way in which exudation of the plasticizer from the film occurs.

In Fig. 3 is illustrated a sheet of glass 14 having applied thereto a film of plastic material 13, while in Fig. 4 there is indicated at 22 the excess plasticizer which comes to the surface of the coating during the cooling thereof.

Figure 5:
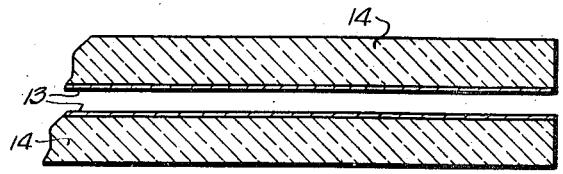
Fig. 5 is a view showing two coated sheets of glass in position to be joined.
Figure 6:
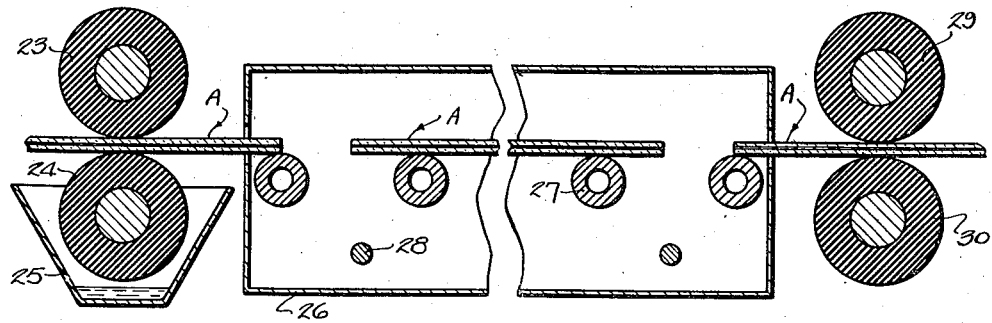
Fig. 6 is a transverse sectional view illustrating the prepressing of the assembled glass sheets.

After two sheets of glass 14 have been coated with the plastic material in the manner above described and cooled, the coated sheets are assembled as shown in Fig. 5, with the plastic coatings 13 and exuded plasticizer 22 placed in contact with one another, to form a sandwich. This sandwich, designated by the letter A in Fig. 6, is subjected to a relatively light initial pressure, preferably at room temperature, by passing it between a pair of nipping rolls 23 and 24 which serve to squeeze the exuded or excess plasticizer from between the glass sheets. Arranged beneath the rolls 23 and 24 is a trough 25 for catching the excess plasticizer squeezed out from between the glass sheets by this nipping operation. This plasticizer, of course, can be rectified and re-used. The prepressed sandwich A then passes into a leer 26 where it is supported upon a plurality of rolls or the like 27; said leer being heated in any desired manner such as by electrical heating elements 28.

Upon emerging from the leer 26, the sandwich passes between a second pair of nipping rolls 29 and 30 which give a closing nip to the glass sheets to prevent ingress of the autoclave fluid therebetween during the final heat and pressure treatment, which may be carried out in an autoclave 31 (Fig. 7) and wherein the glass sheets are subjected to the direct action of a heated fluid 32 under pressure. A plurality of sandwiches A may be supported in the autoclave 31 upon a rack 33 so that a number of laminations may be simultaneously produced. Although the invention is not restricted to the use of any particular autoclave cycle, it is suggested, by way of example, that the sandwich be placed in the autoclave for a period of about five minutes at a temperature of approximately 275° F. and subjected to a pressure of 225 pounds per square inch.

Figures 7, 8:
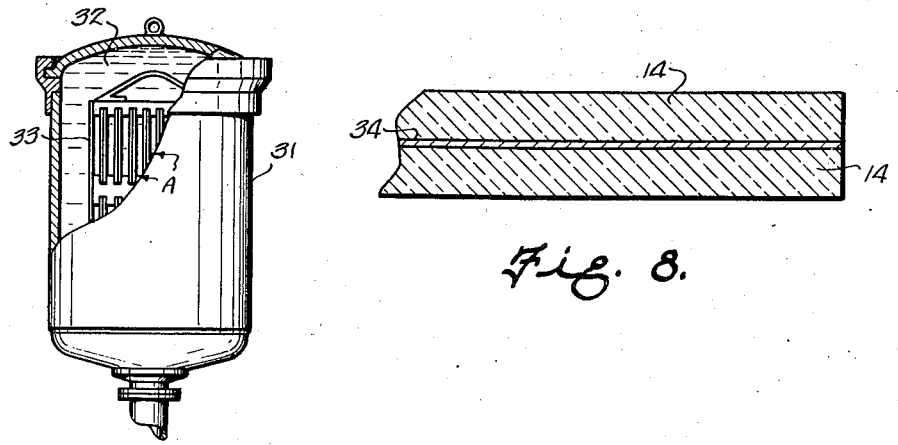
Fig. 7 is a diagrammatic representation of an autoclave in which the prepressed glass sheets are subjected to final heat and pressure treatment.
Fig. 8 is a sectional view of a finished sheet of safety glass produced in accordance with the invention.

As shown in Fig. 8, when the two glass sheets 14 are subjected to heat and pressure, the films of plastic material 13 applied thereto merge or amalgamate with one another to form a single homogeneous sheet or layer of plastic 34 which bonds the glass sheets together to provide a unitary structure.

Figure 2:
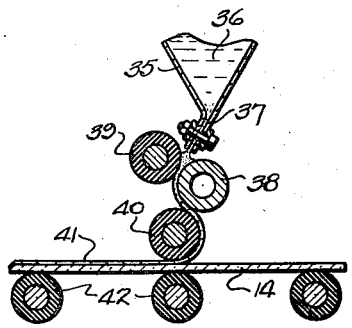
Fig. 2 is a vertical transverse section of a roll type machine which may be used to apply the films of highly plasticized material upon the glass.

If desired, the films of plastic material may be applied to the glass sheets by a roll type machine as shown in Fig. 2. This machine comprises a hopper 35 in which a mass of the plastic material 36 is placed, said material being permitted to flow through an adjustable opening 37 into a pocket formed between the rolls 38 and 39. With the device of Fig. 2, it is ordinarily necessary to employ a somewhat more fluid mass of plastic than with the extrusion device of Fig. 1. By positively rotating the rolls 38 and 39 and also the roll 40 arranged in opposition to roll 38, a film 41 of the plastic material will be rolled upon the surface of the glass sheet 14 as said sheet is carried horizontally on the roller conveyor 42. The thickness of the film 41 deposited upon the glass sheet can be controlled not only by the viscosity of the plastic mass 36 but also by the adjustment of the various rolls, particularly the adjustment of rolls 40 and 42.

I claim:

1. The process of producing laminated glass, comprising preparing a heated homogeneous plastic mass containing an amount of plasticizer in excess of that required in the finished plastic, applying a coating thereof to one surface of each of two sheets of glass, reducing the temperature of said coatings to cause exudation of plasticizer to the exposed surfaces thereof, assembling the glass sheets with the plastic coatings and exuded plasticizer between the same, pressing the assembled glass sheets to remove the excess plasticizer from therebetween, and then uniting the glass and plastic by the application of heat and pressure into a composite structure.

2. The process of producing laminated glass, comprising preparing a heated homogeneous plastic mass containing an amount of plasticizer in excess of the retentivity of the plastic for said plasticizer, applying a coating thereof to one surface of each of two sheets of glass, cooling the glass sheets to cause exudation of plasticizer to the exposed surfaces thereof, assembling the glass sheets with the plastic coatings and exuded plasticizer between the same, pressing the assembled glass sheets at substantially room temperature to squeeze the excess plasticizer from therebetween, then heating the glass sheets and subjecting them to a preliminary pressing, and finally subjecting the glass sheets to heat and increased pressure to unite the glass and plastic into a composite structure.

3. The process of producing laminated glass, comprising preparing a heated homogeneous plastic mass including a mixture of a plasticizer for which the plastic in said mass has a relatively high retentivity with a plasticizer for which the plastic in the mass has a relatively low retentivity to provide an amount of plasticizer in excess of that required in the finished plastic, applying a coating thereof to one surface of each of two sheets of glass, reducing the temperature of said coatings to cause exudation of plasticizer to the exposed surfaces thereof, assembling the glass sheets with the plastic coatings and exuded plasticizer between the same, pressing the assembled glass sheets to remove the excess plasticizer from therebetween, and then uniting the glass and plastic by the application of heat and pressure into a composite structure.

4. The process of producing laminated glass, comprising preparing a heated homogeneous plastic mass including a mixture of a plasticizer for which the plastic in the mass has a relatively high retentivity with a material of high boiling characteristics but for which the plastic in the mass has practically no retentivity to provide an amount of plasticizer in excess of that required in the finished plastic, applying a coating thereof to one surface of each of two sheets of glass, reducing the temperature of said coatings to cause exudation of plasticizer to the exposed surfaces thereof, assembling the glass sheets with the plastic coatings and exuded plasticizer between the same, pressing the assembled glass sheets to remove the excess plasticizer from therebetween, and then uniting the glass and plastic by the application of heat and pressure into a composite structure.

JOSEPH D. RYAN.